United States Patent [19]

Combs

[11] Patent Number: 4,858,373
[45] Date of Patent: Aug. 22, 1989

[54] SMALL ANIMAL TRAP

[76] Inventor: Linsey L. Combs, Rte. 4, Box 185, Holdenville, Okla. 74848

[21] Appl. No.: 261,691

[22] Filed: Oct. 24, 1988

[51] Int. Cl.$^4$ ................. A01M 23/02; A01M 23/36
[52] U.S. Cl. ............................................. 43/61; 43/78; 43/79
[58] Field of Search .................... 43/61, 77, 78, 79

[56] References Cited

U.S. PATENT DOCUMENTS

| | | | |
|---|---|---|---|
| 813,333 | 2/1906 | Tharp | 43/79 |
| 1,404,486 | 1/1922 | Shutoff | 43/78 |
| 1,937,260 | 11/1933 | Young | 43/61 |
| 2,006,111 | 6/1935 | Potigian | 43/79 |
| 2,104,083 | 1/1938 | Krahl | 43/78 |
| 3,362,100 | 1/1968 | Winkler | 43/78 |
| 4,685,245 | 8/1987 | La Pier | 43/78 |

Primary Examiner—Gene P. Crosby
Attorney, Agent, or Firm—Richard F. Bojanowski

[57] ABSTRACT

A small animal trap formed as a walled enclosure having an opening for rodent entry, a plunger in the enclosure parallel to the bottom, and a spring for urging the plunger toward the bottom. A bottom trigger pedal is inside the enclosure, a pivotally mounted cocking lever extends from the inside upper part of the enclosure outside thereof to terminate outside at or near the bottom of the enclosure. The tripper pedal is pivotally connected to the enclosure by a short lever that extends outward of the trap and is releasibly engagable with the cocking lever. When the plunger is raised the cocking lever engages the under side of the plunger and also the short lever on the trigger pedal. Upsetting the pedal releases the cocking lever and the plunger. The cocking lever has a long arm and a short arm, the long arm being used to latch the trigger. The short arm which is activated by a rodent is located in the lower part of the enclosure. The lower end of the lever and the trigger are formed to latch and hold the plunger in a cocked position until upset. The latch is located outside the enclosure.

6 Claims, 4 Drawing Sheets

SMALL ANIMAL TRAP

BACKGROUND OF THE INVENTION

This invention generally relates to small animal traps and particularly to traps having a enclosure wherein the animal is trapped while the mechanism for setting the trap is available from outside the enclosure.

There have been and still are many designs of small animal traps available. Some are designed solely to kill the animal, other to trap it and others to do either. Almost all use a trigger which the animal steps on or nuzzles to release a spring loaded member.

In order to carry out its function the trapping or killing mechanism must have a powerful driving spring. However, a strong spring makes the trap difficult and often dangerous to set. Also, in prior designs inadvertent springing of the trap may injure the user or household pets. Further, the spring often subjects the triggering mechanism to excessive force making the trap hard to spring thus reducing its sensitivity.

The object of the present invention is provision of a trap that avoids the foregoing problems. The invention comprises an enclosed capture chamber containing a plunger that may kill or merely trap the rodent means mounting the plunger for vertical movement, a spring and latch mechanism to load the trap and a trigger to release it.

A further object is provision of mechanism whereby the entire loading and setting operation is done outside the enclosure containing the plunger.

The mechanism is designed so that a heavy spring force may be stored in the loaded trap yet is sensitive so that it can be latched and released with a very light touch.

The trap comprises an enclosure, usually an elongated rectangular housing with at least one opening for a rodent, and slots at or adjacent the top and bottom of one sidewall. A plunger is fitted inside the enclosure generally parallel to the bottom. The plunger has an arm extending from the upper face thereof upwardly through the slot in top of the enclosure. A spring ia connected between the enclosure and the arm of the plunger and is arranged to resist the upward movement of the plunger within the enclosure. As a result, the spring is primed to urge the plunger downward to strike or, alternatively, to capture the animal when the mechanism is triggered.

A specific mechanism is provided enabling latching the trap by use of only very light pressure. Thus, even though high spring forces may be applied to the plunger the mechanism is arranged so that plunger may be cocked and the trap moved about from outside the enclosure without one's hands ever being exposed to the triggering pedal or the dangerous plunger.

The trap is designed for quick disassembly and reassembly for adapting it to use as a lethal trap or a mere capture trap.

In order that the invention may be more readily understood and carried into effect, reference is made to the accompanying drawings and description thereof which are offered by way of example only and not in limitation of the invention the scope of which is defined by the appended claims and equivalents embraced therein rather than any mere description.

DETAILED DESCRIPTION OF THE INVENTION

Figure 1:
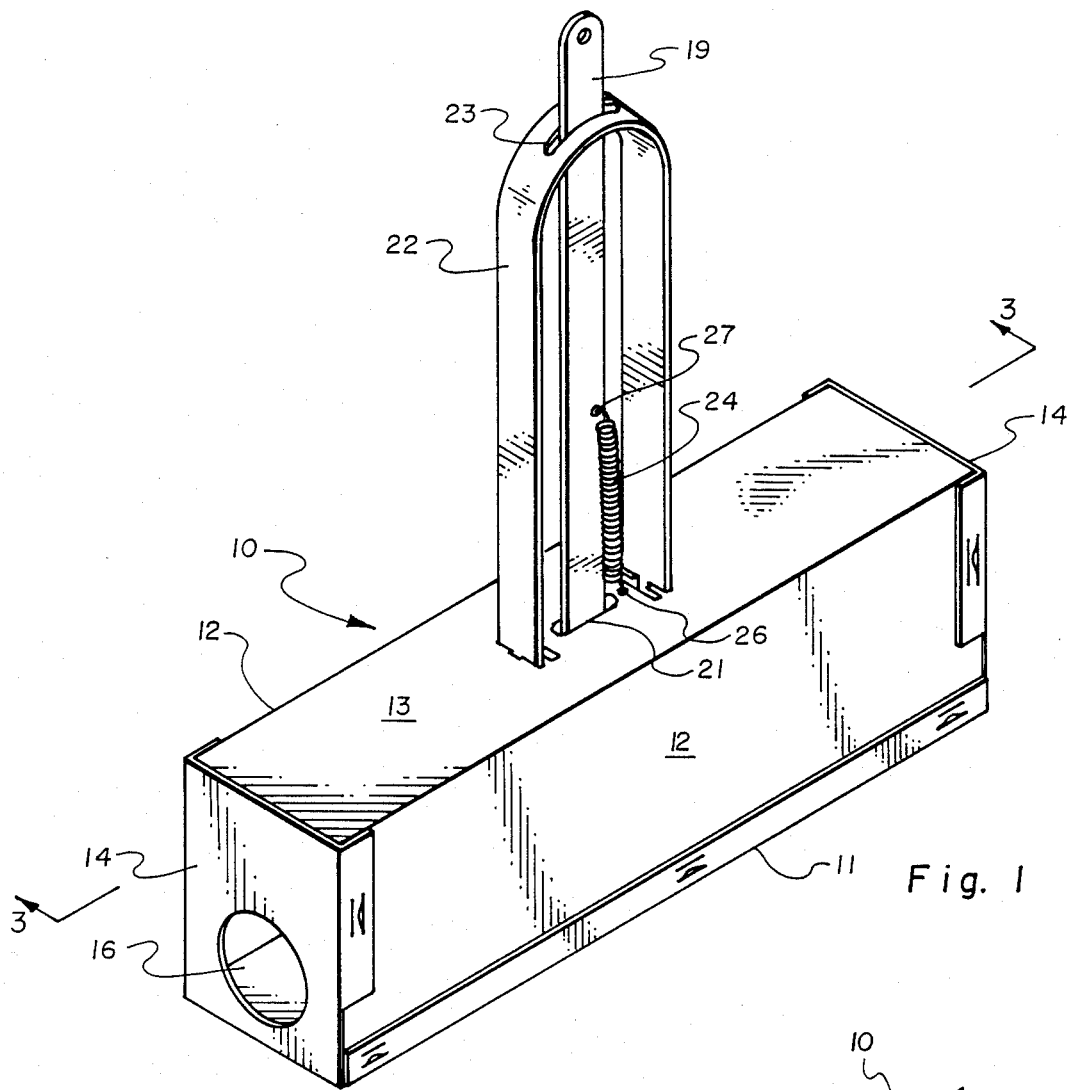
FIG. 1 is a perspective view of a trap embodying the invention.
Figure 2:
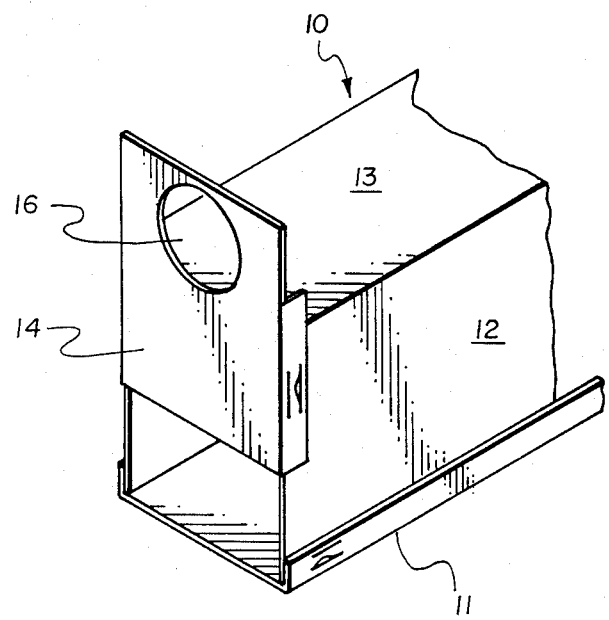
FIG. 2 is a partial view of modified form of the trap shown in FIG. 1.
Figure 3:
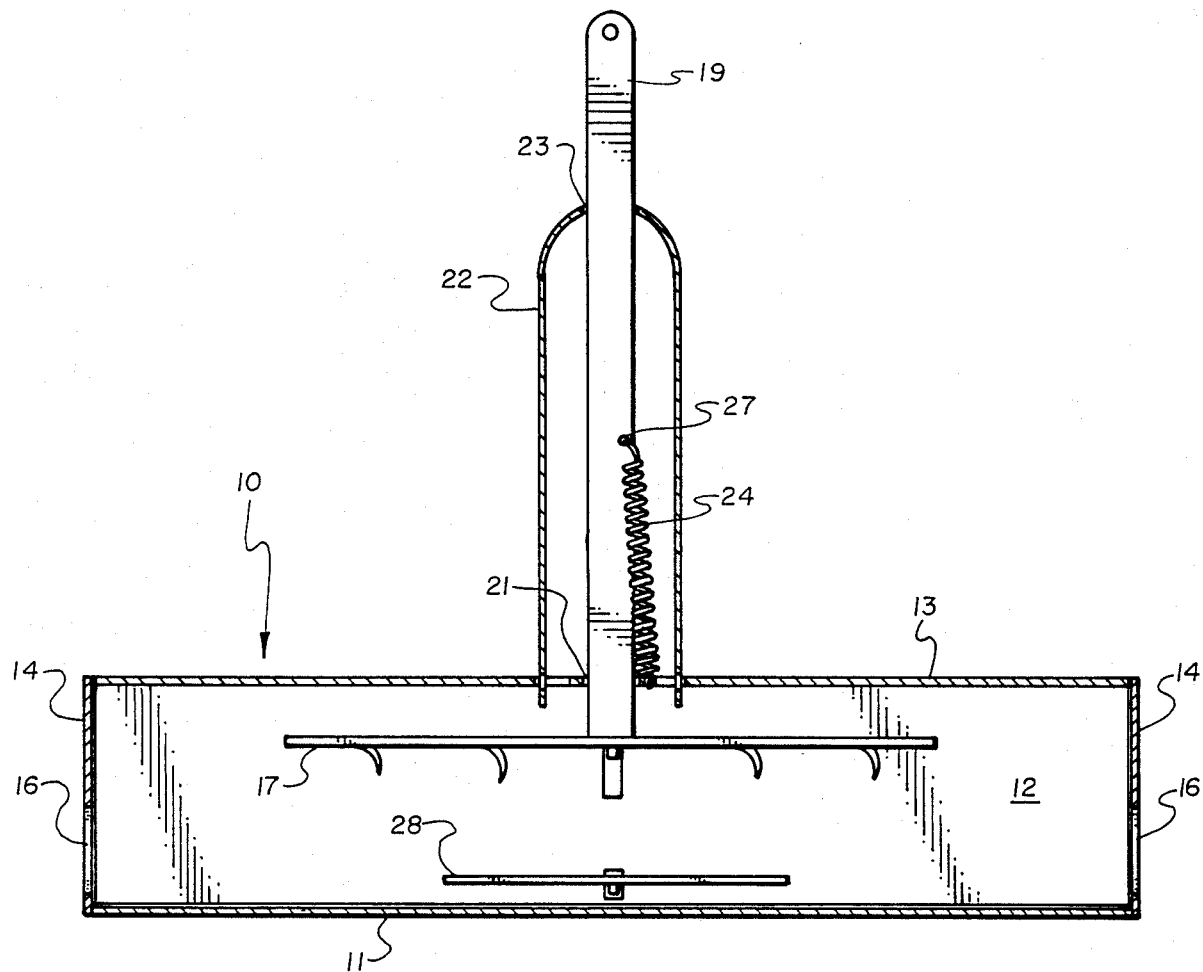
FIG. 3 is a sectional view taken in the plane of line 3—3 of FIG. 1 and looking in the direction of the arrows.
Figure 5:
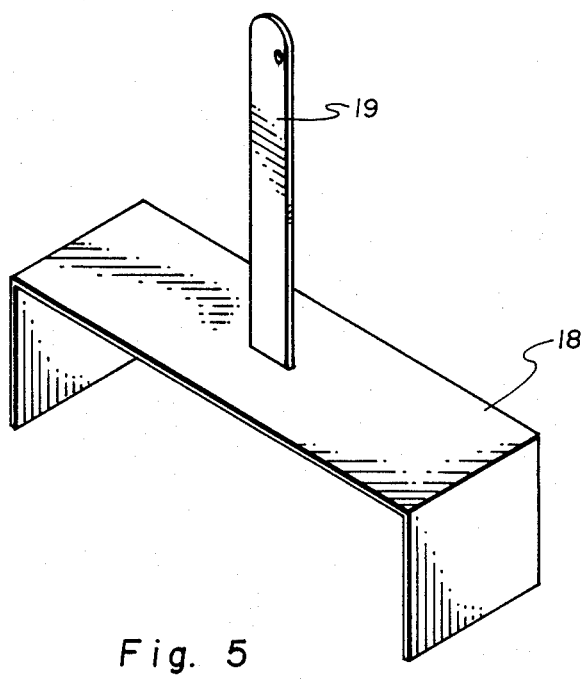
FIG. 5 is a perspective view of a live capture plunger for use in the trap.
Figure 4:
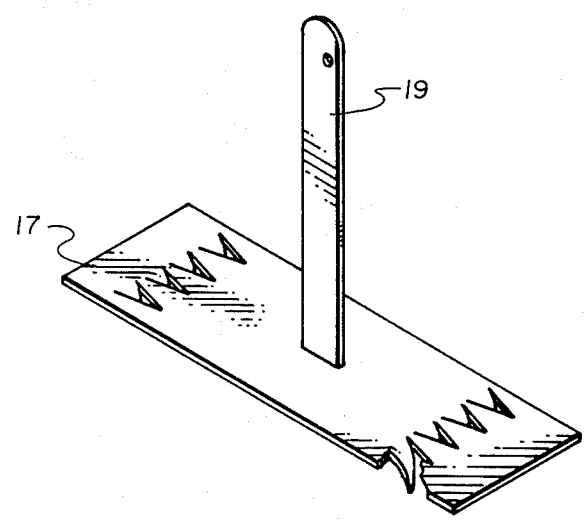
FIG. 4 is a perspective view of a form lethal plunger used in the trap.

The trap comprises an elongated enclosure, generally designated 10, in turn defined by a bottom 11, sidewalls 12 and a top 13 that connects between the side walls 12 to form a U. The enclosure has detachable ends 14 each of which is provided with a rodent entry port 16. The bottom and ends are provided with side flanges to enable quick assembly and disassembly.

A plunger 17 (lethal) or 18 (capture) is contained in the enclosure. The plunger has a central extension arm 19 that extends at a right angle from its top surface upwardly through a hole 21 in the enclosure top to terminate thereabove. A flat spring-like member 22 is bent in a "U" shape above the hole 21 to protect and guide the arm. The guide has a slot 23 through which the arm passes and which, with slot 21, guides the plunger. A tension spring 24 is connected between a suitable connection 26 on the enclosure and a connection point 27 on the arm to urge the plunger downwardly within the enclosure.

A trigger, in the form of a pedal 28 is located about the middle of the enclosure just above the bottom. The trigger has a side arm 29 extending through a slot 31 in the wall over a pivotal connection 32 on the outside wall of the enclosure. The side arm extends past the pivot point to terminate in a small hook or sear 34. The sidearm works with an arcuate lever arm 36. The free end of which may be moved into and out of engagement with the plunger to selectively hold it in or release it from the loaded position.

Figure 6:
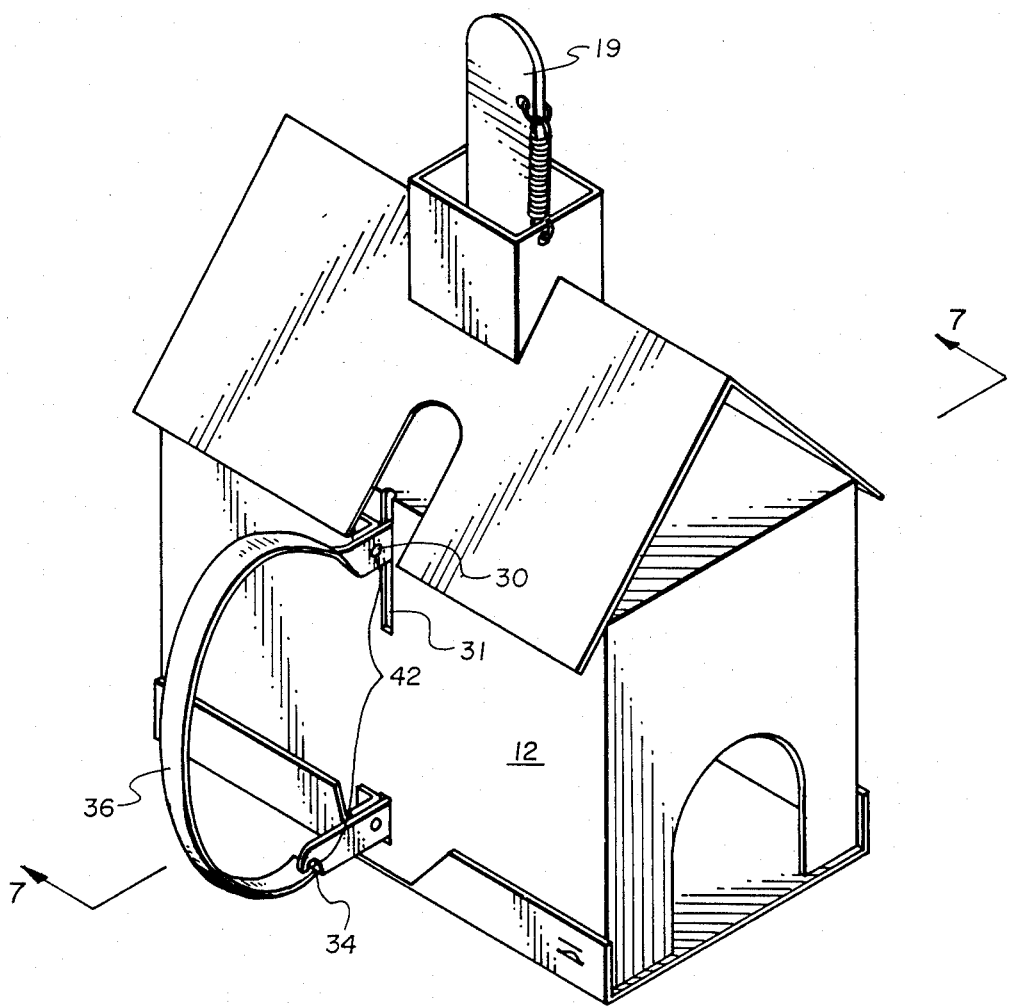
FIG. 6 is a perspective view of an embodiment of the invention similar to FIG. 1 but taken from the opposite side to illustrate more detail of the mechanism and also showing a variant shape enclosure.
Figure 7:
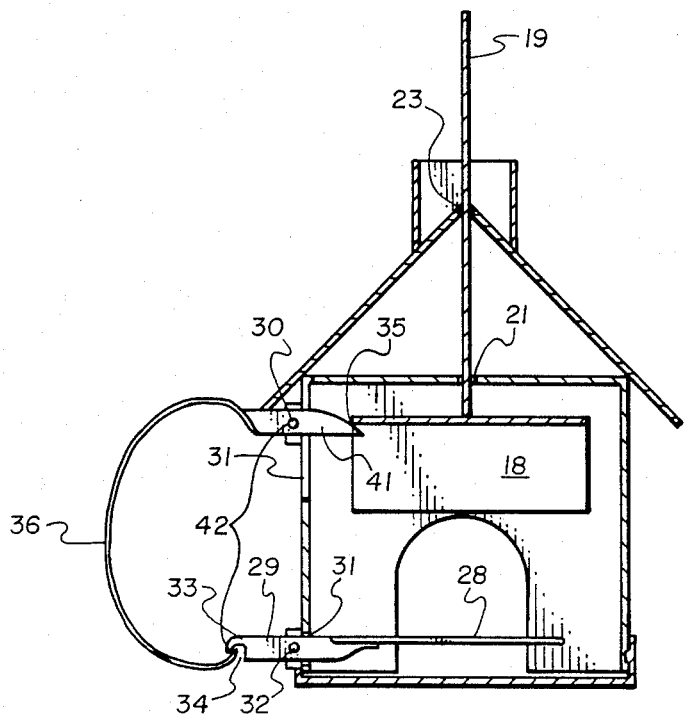
FIG. 7 is a sectional view taken in the plane of lines 7—7 of FIG. 6.

A fulcrum or pivot 30 near the upper end of the lever connects it to the enclosure adjacent a slot 31 near the top of the side wall 12. The short end 41 of the lever extends through the slot into the enclosure a sufficient distance to engage the plunger 17 when the latter is in the upper (loaded) position. The free end of the long arcuate lever 36 is free to swing to the lower slot 33 in the sidewall where it engages the sear 34 on the platform arm 29 extending therethrough as indicated in FIGS. 6 and 7. The effective length of the long arcuate arm is designated 42. The lever arrangement is important. The arcuate shape permits it to be completely out of the operative part of the trap. The high ratio of the long lever 42 to the short lever 41 requires that only a light force be applied at the catch end 35 to restrain the total spring force applied by the edge of the raised plunger 17 against the short lever 41. In other words, the sear 34 is sensitive. A light upset on the trigger pedal releases the sear and the lever swings away due to the down spring force on the short lever 41 above. Once the plunger starts down it continues until it strikes or captures the animals. To facilitate the action, the short lever 35 is formed with a curved surface.

If desired, the outside configuration shown in FIGS. 6 and 7 may be used, but the function will be the same as in the rectangular form.

It is important that the guide arm or rod on the plunger be guided axially to avoid it being canted and bound. To this end, the top slot 21 and the guide slot 23 should not be too big and they should be sufficiently spaced apart and aligned so the arm can be guided thereby.

The ends 14 are made so they may be installed with the port near the bottom as in FIG. 1 or they may be taken off and reinstalled with the entire bottom end of the enclosure open to permit entry of larger animals.

When the trap is constructed as shown with the trigger pedal pivotally connected to the side walls the trap may be used without the bottom in place. Thus a portion of a mole's tunnel may be removed and a bottomless trap set in the mole's path.

I claim:

1. A small animal trap comprising an elongated enclosure, having a top, endwalls, bottom, sidewalls and a plunger having a flat portion in said enclosure parallel to the bottom thereof and movable between an unloaded position near the bottom thereof and a loaded position above the unloaded position, resilient means connected between said plunger and said enclosure in a manner to urge said plunger toward said unloaded position, a relatively small central opening in the top of said enclosure, an elongated arm extending from the top surface of said plunger outwardly through said opening, one sidewall of said enclosure having a lower opening adjacent its bottom edge and an upper opening adjacent its top edge said openings being at about the longitudinal center of said enclosure, a trigger inside said enclosure near its center, a trigger arm extending from said trigger to terminate outside the enclosure, a first pivotal connection means pivotally connecting said trigger arm intermediate its ends to the enclosure to enable said trigger to pivot between a set position and a released position, said trigger arm terminating in a first free end outside said enclosure, an upper lever arm second pivotal connection means pivotally connecting said upper lever arm to said enclosure adjacent the top thereof and functionally dividing said lever into a short lever and a long lever, said short lever being formed to extend from said second pivotal connection to terminate in a free end inside said enclosure at a location beneath said plunger when the latter is in said loaded position, said long lever being formed to extend from said second pivotal connection to terminate outside said enclosure in a second free end adjacent the bottom of said enclosure and near said first free end, said first and second free ends having complemental releasable latching means for holding said free ends together only when said trigger is in the set position and said free end of said short lever is beneath said plunger.

2. A trap according to claim 1 in which said plunger has spikes extending from its lower surface.

3. A trap according to claim 1 in which said plunger is formed with downwardly extending end plates at its opposite ends and said plunger and plates are approximately the same width as said enclosure.

4. A trap according to claim 1 in which said elongated enclosure is rectangular in cross section and is formed with detachable end doors forming said endwalls and wherein said bottom is detachable.

5. A small animal trap according to claim 1 with the addition of a guide means spaced above said enclosure top, a guide opening in said guide means, said arm extending from the top surface of said plunger extends through said guide opening, and said resilient means comprises a spring connected between said arm outside said enclosure to urge said plunger downward.

6. A trap according to claim 1 in which said long lever arm is arcuate.

* * * * *